US012539738B2

(12) United States Patent
Spies et al.

(10) Patent No.: US 12,539,738 B2
(45) Date of Patent: Feb. 3, 2026

(54) COMPONENT MODULE FOR A HEAT PUMP SYSTEM OF A VEHICLE

(71) Applicant: Hanon Systems, Daejeon (KR)

(72) Inventors: Toni Spies, Kerpen (DE); Florian Bieregger, Munich (DE)

(73) Assignee: HANON SYSTEMS, Daejeon (KR)

( * ) Notice: Subject to any disclaimer, the term of this patent is extended or adjusted under 35 U.S.C. 154(b) by 157 days.

(21) Appl. No.: 18/657,874

(22) Filed: May 8, 2024

(65) Prior Publication Data
US 2024/0399835 A1 Dec. 5, 2024

(30) Foreign Application Priority Data

May 31, 2023 (DE) .................. 10 2023 114 189.9
Jan. 10, 2024 (DE) .................. 10 2024 100 640.4

(51) Int. Cl.
*B60H 1/32* (2006.01)

(52) U.S. Cl.
CPC .................. *B60H 1/3223* (2013.01)

(58) Field of Classification Search
CPC ............. B60H 1/3223; B60H 1/3229; B60H 1/00485; B60H 1/00278; B60H 1/00392; B60H 1/3204; B60H 1/3227; B60H 1/3228; B60H 1/00571; F25B 30/02; F25B 31/00; F25B 41/20; F25B 41/31; F25B 41/40; F25B 43/006; B60Y 2200/91; B60Y 2304/01; B60Y 2304/072
See application file for complete search history.

(56) References Cited

U.S. PATENT DOCUMENTS

2019/0039440 A1  2/2019  Calderone

FOREIGN PATENT DOCUMENTS

| CN | 113276630 A | * | 8/2021 | .............. F25B 41/42 |
| DE | 102023118683 A1 | | 2/2024 | |
| DE | 102023118686 A1 | * | 3/2024 | ............ H01M 10/54 |
| EP | 2629040 B1 | | 7/2020 | |
| EP | 4144548 A1 | * | 3/2023 | ......... B60H 1/00571 |
| EP | 4144549 A1 | * | 3/2023 | ........... B60H 1/3229 |
| ES | 2629040 T3 | * | 8/2017 | ......... C08G 18/6588 |
| FR | 3135422 A1 | * | 11/2023 | ......... B60H 1/00278 |
| WO | 2021048095 A1 | | 3/2021 | |
| WO | WO-2021045095 A1 | * | 3/2021 | ........... G01N 33/483 |
| WO | WO-2024034900 A1 | * | 2/2024 | ........... B60H 1/3226 |

* cited by examiner

*Primary Examiner* — Frantz F Jules
*Assistant Examiner* — Emmanuel E Duke
(74) *Attorney, Agent, or Firm* — Shumaker, Loop & Kendrick, LLP

(57) ABSTRACT

A component module of a heat pump system for vehicles which has at least a compressor with a compressor housing, which extends with its body length along a compressor rotation axis, a first heat exchanger and a second heat exchanger, which have a body length greater than a body width, a collecting container for refrigerant, a fluid distribution device, which is designed for influencing a refrigerant flow path, refrigerant fluid interfaces, coolant fluid interfaces and refrigerant fluid lines which fluidly connect the components to one another, wherein the first heat exchanger is orientated with its body length along a first main direction, the second heat exchanger is orientated with its body length orthogonally to the first main direction along a vertical direction, and the compressor housing is orientated with its body length along a second main direction which is parallel to the first main direction offset in a longitudinal direction.

14 Claims, 2 Drawing Sheets

COMPONENT MODULE FOR A HEAT PUMP SYSTEM OF A VEHICLE

CROSS-REFERENCE TO RELATED APPLICATIONS

The present application claims the benefit of and priority to German Patent Application No. 10 2024 100 640.4, filed Jan. 10, 2024 and German Patent Application No. 10 2023 114 189.9, filed May 31, 2023, the entire contents of each of which are incorporated herein for all purposes by reference.

FIELD

The invention relates to a component module for a heat pump system of a vehicle, in particular for a heat pump system of a battery-electric vehicle. The component module comprises several components of a heat pump system and is suitable for heating and/or cooling.

BACKGROUND

Heat pumps offer an efficient method for transferring heat energy, which is why they are preferably employed in battery-electric vehicles (BEV). Heat pumps serve on the one hand to control the temperature of the vehicle interior and on the other hand to control the temperature of the vehicle batteries. Temperature control of the vehicle batteries ensures optimum operating conditions, which leads to improved performance and prolongs the service life of the vehicle batteries. This is important in order to increase the range and reliability of battery-electric vehicles. Temperature control comprises a temperature change either for heating or for cooling, wherein the heat pump can use different heat sources and heat sinks in different fluid circuits. For example, the commissioning of a BEV at low outside temperatures first requires heating of the vehicle batteries, wherein ambient air serves as a heat source. For electrical charging and discharging, on the other hand, cooling of the vehicle batteries may be necessary in order to counteract overheating as a result of heat development. The heat generated in the batteries can be discharged to the surroundings or to the vehicle interior for heating purposes by means of coolant circuits.

A heat pump system comprises various components fluidly connected to one another in a refrigerant circuit. These typically include a compressor for compressing a refrigerant, a first heat exchanger acting as an evaporator, a second heat exchanger acting as a condenser, and an expansion member for varying the pressure of a circulating refrigerant. The heat pump system uses the principle of vaporisation and condensation of the refrigerant, wherein heat is transferred between the refrigerant and a further fluid, for example a coolant of a separate coolant circuit, in the heat exchangers. The coolant then serves to transport the heat to the desired location in or on the vehicle.

In the past, a high space requirement for heat pump systems was often in conflict with the arrangement of further vehicle components. This was the reason for further developments towards more compact component arrangements, in which several components of the heat pump system are fluidly connected to one another in a common module. An example of such an arrangement is shown in the teaching EP 4 144 549 A1. The heating and/or cooling module described there comprises as components a compressor with a heat exchanger for heat transfer between a refrigerant and a coolant, and a storage device for storing refrigerant. The individual components are fluidly connected to one another such that a refrigerant can circulate. The arrangement of the components is orientated on a spatial axis system consisting of an L-direction, a T-direction orthogonal to the L-direction and a V-direction orthogonal to the L- and T-direction. The heat exchanger extends with its longest body size or with its body length parallel to the L-direction, wherein the compressor extends with its longest body side, which corresponds to the orientation of the rotation axis of the compressor, essentially along the T-direction and thus is orientated orthogonally with respect to the heat exchanger. This arrangement enables a space-saving configuration of the components—but has an increased installation space requirement in the L-V plane spanned by the L- and V-directions, in particular in the L-direction. This arrangement of the components makes it necessary for the connecting lines, such as, for example, the refrigerant line between the compressor and the heat exchanger, to extend in part over the entire L-V plane due to the design, as a result of which access to further coolant or refrigerant lines and to electrical plug-in connections is partially blocked. Furthermore, the extent of the arrangement in the L-V plane cannot be achieved without additional holders, since the heat exchanger must be supported relative to the compressor, which involves additional cost and increases the module weight.

SUMMARY

Against this background, the object of the invention is to propose a component module for a heat pump system of a motor vehicle/BEV which requires an even smaller installation space volume for the arrangement of the various components and ensures better access to refrigerant and coolant fluid lines and electrical connection devices.

The object is achieved by a refrigerant module having the features shown and described herein.

A space-saving spatial arrangement of components of a heat pump system within a component module is proposed. The component module according to the invention has at least the following components: a compressor for compressing a refrigerant, wherein the compressor is received in a compressor housing which extends with its body length along a compressor rotation axis. As further components, the component arrangement has a first heat exchanger and a second heat exchanger. The heat exchangers are designed to transfer heat between a refrigerant and a coolant and have a body length greater than a body width. Furthermore, a collecting container for refrigerant is provided in order to store the refrigerant at least partially in liquid form in the course of the refrigerant circuit. As a further component, a fluid distribution device is provided which is designed to influence a refrigerant flow path. The components have fluid interfaces for refrigerant and/or coolant and fluid lines, by means of which the components are fluidly connected to one another. In the following, fluid lines for refrigerant are referred to as refrigerant fluid lines. Likewise, fluid interfaces for refrigerant or coolant are referred to as refrigerant fluid interfaces or coolant fluid interfaces.

According to the invention, the components are orientated in their arrangement within the component module as follows: the first heat exchanger is orientated with its body length along a first main direction, wherein the second heat exchanger is orientated with its body length orthogonal to the first main direction along a vertical direction. The body length of the first heat exchanger thus extends perpendicularly to the body length of the second heat exchanger, wherein an air gap is present between the first heat exchanger and the second heat exchanger in order to avoid a heat bridge. The compressor housing is orientated with its body length along a second main direction which coincides with the compressor rotation axis and is parallel to the first main direction offset in a longitudinal direction. As a result, the first heat exchanger and the compressor housing are arranged with their body lengths parallel next to one another, which reduces an extent of the component module in the longitudinal direction orientated transversely to the main directions.

According to the concept of the invention, the two parallel main directions, the longitudinal direction and the vertical direction, relate to spatial axes, of which the two main directions and the longitudinal direction orientated perpendicularly to the two main directions can lie in one plane, wherein the vertical axis is orientated perpendicularly with respect to the plane formed from the two main directions and the longitudinal direction. According to a further design, one of the two main directions and the longitudinal direction form a plane, wherein the other main direction is displaced in the direction of the vertical axis.

According to a preferred design, the heat exchangers are essentially formed in the shape of a cuboid which has a body length greater than a body width. The cuboid shape can have two body widths of different sizes, which are however in each case smaller than the body length.

The spatial extent of the component module in the first main orientation is achieved by the arrangement of the second heat exchanger with the orientation of its body length in the direction of the vertical axis. Thus, the first heat exchanger and the second heat exchanger can be arranged next to one another along the first main direction without substantially projecting beyond the spatial extent of the body length of the compressor housing. Preferably, however, the heat exchangers are dimensioned such that they are arranged next to one another along the first main direction and do not project beyond the spatial extent of the body length of the compressor housing.

The arrangement of the components of the component module according to the invention is conceptually based on a uniform extent in the available spatial directions, with the aim of achieving the smallest possible installation space volume. The components with their body lengths are advantageously arranged within the component module such that the spatial extent of the component module in the relevant spatial directions is minimal. In this concept, a spatial extent as described in the prior art, which is substantially greater in a single spatial direction in relation to the extent in further spatial directions, is avoided, as a result of which a reduction of the required installation space volume is advantageously achieved.

A fastening of the first heat exchanger and/or of the second heat exchanger to the compressor housing can be provided inside the component module. Further, the first heat exchanger can be fastened to the second heat exchanger, wherein the second heat exchanger is then fastened to the compressor housing. Preferably, the first heat exchanger is fixedly screwed to the compressor housing.

The fluid distribution device can have a valve block with at least two, preferably three, particularly preferably four valves, wherein the valves in the valve block are orientated parallel to the vertical direction. Through the valves, different flow paths for refrigerants and thus different operating modes for temperature control can be realised. While in designs with two valves these serve as expansion valves, designs with three or four valves can realise further operating modes, such as, for example, an (inefficient) boost heating operation.

The valve block of the fluid distribution device and the first heat exchanger can be connected to one another such that the first heat exchanger and the valve block of the fluid distribution device form a fluid connection for the refrigerant without external refrigerant fluid lines being required between the first heat exchanger and the valve block of the fluid distribution device. In this case, the fluid connection for refrigerant is provided by corresponding refrigerant fluid interfaces formed in the housing of the opposite components. For this purpose, the first heat exchanger and the valve block of the fluid distribution device can be contacted with one another on mutually facing sides such that no external fluid lines are required between the first heat exchanger and the valve block. The corresponding openings of opposite refrigerant fluid interfaces thus enable a refrigerant flow from the valve block of the fluid distribution device into the first heat exchanger. In order to avoid leaks, seals, such as a surface seal, can be arranged between the valve block of the fluid distribution device and the first heat exchanger.

An air gap can be formed between the compressor housing and the second heat exchanger in order to avoid a heat bridge.

A fastening of the components to and on the compressor housing is preferred, because the compressor housing has a high rigidity and a sufficient material volume for forming threaded holes into which fastening screws for fastening the further components can be screwed.

In the configuration according to the invention, the component module is provided in particular for battery-electric vehicles (BEVs), since it is designed for heating and/or cooling.

According to a preferred design of the component module according to the invention, the first heat exchanger and the second heat exchanger are fluidly connected to one another such that the first heat exchanger is designed as an evaporator (chiller) for refrigerant, wherein the second heat exchanger is designed as a condenser for refrigerant. The second heat exchanger can be designed as a combination of a condenser and an internal heat exchanger (IHE) and can thus be employed for different operating modes. In this respect, a refrigerant fluid line can be formed between the second heat exchanger and the valve block of the fluid distribution device. An internal heat exchanger refers to the function of a heat exchanger internal to a refrigerant circuit.

Both heat exchangers are suitable for transferring heat between a refrigerant and a coolant. The fluid connection of the heat exchangers enables a heating operation and/or a cooling operation, so that the component module is suitable for heating and/or cooling. The first heat exchanger and the second heat exchanger are thus directly fluidly connected to one another.

Following the concept of the space-saving arrangement, the fluid distribution device, which is designed to influence the flow paths of the refrigerant within the component module, can preferably be fastened to the compressor housing along the body length of the compressor housing next to the second heat exchanger such that it does not project beyond the body length of the second heat exchanger in the vertical direction. The installation space height of the fluid distribution device is thus advantageously at the same height in the vertical direction or below the spatial extent of the body length of the second heat exchanger when it is fastened to the compressor housing. An air gap can be formed in the longitudinal direction between the fluid distribution device and the second heat exchanger, which prevents direct contact between these components. For fastening, the fluid distribution device can be screwed to the compressor housing.

The collecting container for refrigerant is designed to store refrigerant in liquid form. Its body length, which preferably has a circular cylindrical shape, can be greater than a body width, wherein the collecting container is arranged next to the second heat exchanger and is orientated with its body length parallel to the vertical direction. Preferably, the collecting container is arranged along the first main direction next to the second heat exchanger, so that the second heat exchanger is located along the first main direction in an arrangement between the collecting container and the first heat exchanger. The collecting container can be dimensioned such that it does not project beyond the second heat exchanger in the vertical direction.

In order to reduce noise, a muffler can be provided as a further component along the refrigerant circuit of the component module. The muffler can have a body length greater than a body width, wherein the muffler can be orientated with its body length essentially parallel to the longitudinal direction within the arrangement in the component module next to the collecting container, according to a design of the component module. In this orientation, the muffler is arranged offset transversely to the collecting container in the direction of the main directions with respect to the collecting container. The muffler is preferably dimensioned with its body length such that it does not project beyond the other components of the component module arranged next to one another in the longitudinal direction. Due to its relatively small dimensions, the muffler can also be arranged in a space-saving manner at other positions of the component module.

The component module has fluid interfaces as fluid connections for integration on a coolant circuit and further fluid interfaces as fluid connections for a refrigerant circuit. According to a preferred design of the component module, all coolant fluid interfaces are located on one side of the component module. This means that the coolant connections of the first heat exchanger and of the second heat exchanger are orientated towards one side of the component module. Thus, all coolant fluid interfaces are advantageously accessible from one side of the component module.

According to a particularly preferred design, the second heat exchanger has an inner side and an outer side in the arrangement in the component module, wherein at least one refrigerant fluid interface is designed on the inner side to be orientated parallel to the first main direction. A refrigerant fluid line connecting the compressor housing and the second heat exchanger can be connected to the at least one refrigerant fluid interface. This has the advantage that the refrigerant fluid line can be connected parallel to the first main direction and thus does not project beyond the second heat exchanger in the vertical direction. As a result, the refrigerant fluid lines are protected and arranged with little space requirement. The inner side of the second heat exchanger faces an inner side of the oppositely arranged first heat exchanger. The heat exchangers arranged next to one another along the first main direction thus have inner sides facing opposite one another, between which an air gap is formed.

On its outer side opposite the inner side, the second heat exchanger can likewise have refrigerant fluid interfaces, wherein it is possible for the refrigerant fluid interfaces formed on the outer side to be orientated parallel to the first main direction.

The component module according to the invention realises an even more compact arrangement of components of a heat pump system, so that an even further reduction in installation space volume is advantageously achieved. Because the components are fastened to one another, the component module is given sufficient stability and rigidity without further holders or node elements being required. This contributes to a weight reduction and ultimately to a cost reduction.

BRIEF DESCRIPTION OF THE DRAWINGS

Further details, features, and advantages of designs of the invention will become apparent from the following description of exemplary embodiments with reference to the accompanying drawings. In the drawings.

DETAILED DESCRIPTION

Figure 1:
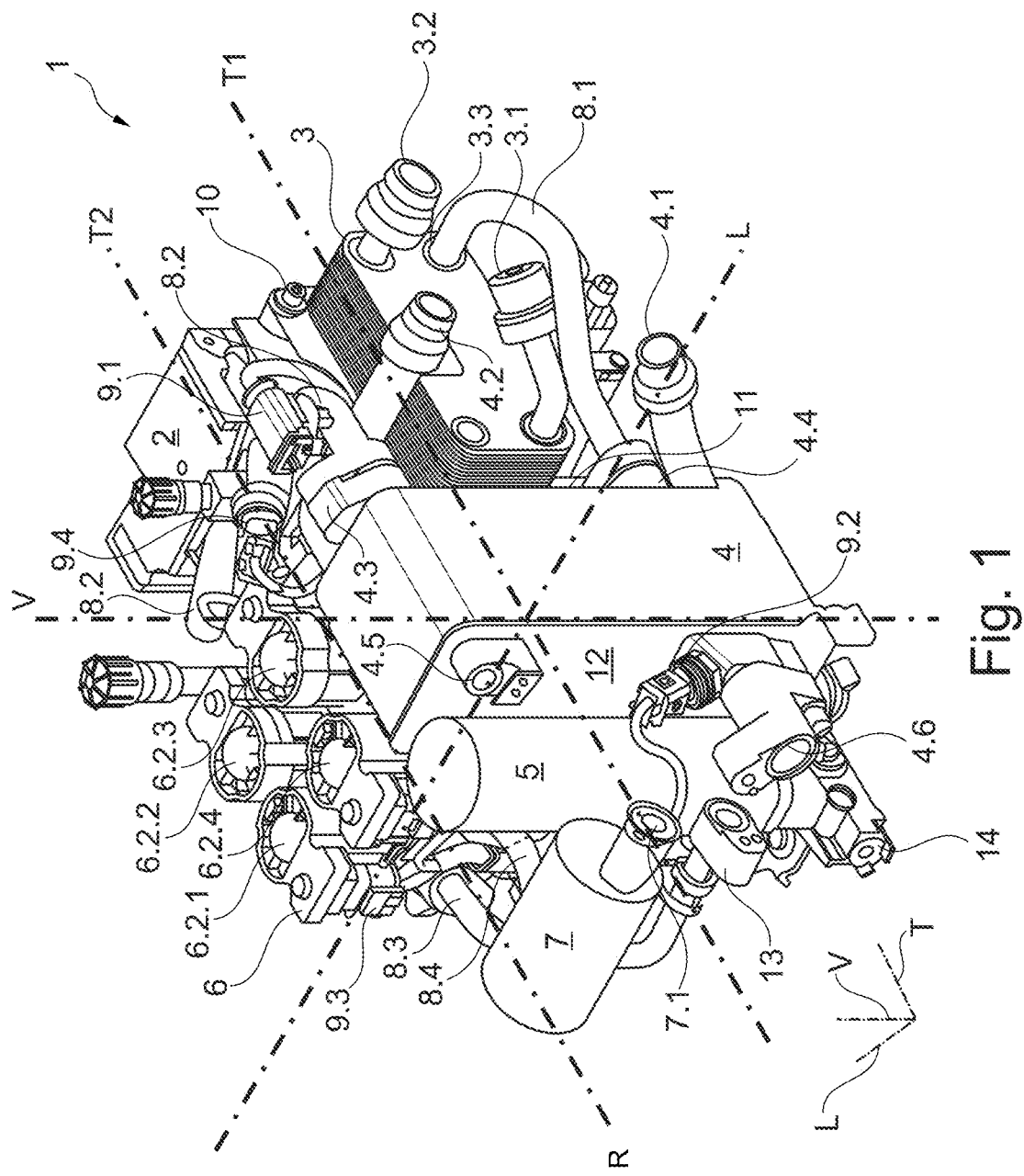
FIG. 1: shows a schematic perspective view of an exemplary embodiment of the component module for a heat pump system of a vehicle.

In the figures, recurring features of the component module for a heat pump system of a vehicle are identified by the same reference numerals.

FIG. 1 shows a schematic perspective view of an exemplary embodiment of the component module 1 for a heat pump system of a vehicle. As components, the component arrangement 1 comprises a compressor for compressing a refrigerant, wherein the compressor is accommodated in a compressor housing 2 which extends with its body length along a compressor rotation axis R. As further components, the component arrangement 1 has a first heat exchanger 3 and a second heat exchanger 4. Both heat exchangers 3 and 4 have a cuboid shape with a body length greater than a body width. The cuboid shape can have two body widths of different sizes, which are however in each case smaller than the body length.

The first heat exchanger 3 is orientated with its body length along a first main direction T1, wherein the second heat exchanger 4 is orientated with its body length orthogonal to the first main direction T1 along a vertical direction V. The body length of the first heat exchanger 3 thus extends perpendicularly to the body length of the second heat exchanger 4, wherein an air gap is present between the first heat exchanger 3 and the second heat exchanger 4. The first heat exchanger 3 is designed to transfer heat between a coolant and a refrigerant and has two coolant fluid interfaces 3.1 and 3.2. The coolant fluid interfaces 3.1 and 3.2 serve as fluid connections for integration into a coolant circuit. For integration into the refrigerant circuit, the first heat exchanger 3 has two refrigerant fluid interfaces, of which only one can be seen in the representation shown. It is identified by reference numeral 3.3. A first fluid interface 3.3 for refrigerant of the first heat exchanger 3 leads via a refrigerant fluid line 8.1 to a fluid connection to a refrigerant fluid interface 4.4 of the second heat exchanger 4. According to an advantageous design, the refrigerant fluid line 8.1 is designed as an integral part of the first heat exchanger 3 without projecting beyond the dimensions of the first heat exchanger 3 to an outer side of the component module 1. The refrigerant fluid interface 4.4 is formed on an inner side 11 of the second heat exchanger 4 and is orientated parallel to the first main direction T1. The fluid interfaces 3.3 and 4.4 are screwed together.

The second refrigerant fluid interface of the first heat exchanger 3 is located on a side facing the compressor housing 2, on which side the first heat exchanger 3 is advantageously screwed to the compressor housing 2 by means of two screws. In the exemplary embodiment shown, only one of the two screws 10 can be seen due to the perspective view. The compressor housing 2 is orientated with its body length along a second main direction T2 which coincides with the compressor rotation axis R and is parallel to the first main direction T1 offset in a longitudinal direction L. The second refrigerant fluid interface of the first heat exchanger 3 leads directly into the valve block 6.1 by means of a refrigerant fluid line.

From the compressor housing 2, a refrigerant fluid line 8.2 leads to a further refrigerant fluid interface 4.3 for refrigerant formed on the inner side 11 of the second heat exchanger 4, wherein the refrigerant fluid line 8.2 is screwed to the refrigerant fluid interface 4.3. This further refrigerant fluid interface 4.3, like the refrigerant fluid interface 4.4, is orientated parallel to the main direction T1.

The refrigerant fluid lines 8.1 and 8.2 are formed to be rigid. Optionally, the refrigerant fluid line 8.2 can be designed flexibly in some regions. By screwing the refrigerant fluid lines 8.1 and 8.2 to the refrigerant fluid interfaces 4.4 and 4.3, the second heat exchanger 4 is fastened in the arrangement of the component module 1. In addition, a component module holder 14 is provided to which the second heat exchanger 4 is fastened, wherein the component module holder 14 is screwed to the compressor housing 2. Optionally, a further screw connection of the second heat exchanger 4 to the first heat exchanger 3 and/or the compressor housing 2 can be provided.

Further refrigerant fluid interfaces 4.5 and 4.6 are formed on an outer side 12 of the second heat exchanger. These further refrigerant fluid interfaces 4.5 and 4.6 are likewise orientated parallel to the first main direction T1.

Furthermore, the second heat exchanger 4 has two coolant fluid interfaces 4.1 and 4.2 in order to enable an integration of the second heat exchanger 4 into a coolant circuit. The coolant fluid interfaces 4.1 and 4.2 are orientated to an outer side of the component module 1. Thus, the coolant fluid interfaces 3.1 and 3.2 of the first heat exchanger 3 and the coolant fluid interfaces 4.1 and 4.2 of the second heat exchanger 4 are accessible from one side of the component module 1.

In the exemplary embodiment shown, the first heat exchanger 3 is designed acting as an evaporator (chiller) for refrigerant, wherein the second heat exchanger 4 is designed acting as a condenser for refrigerant supplied in compressed form. Optionally, the second heat exchanger 4 can be designed as a combined heat exchanger acting as a condenser and acting as an inner heat exchanger.

As a further component, the component module 1 has a fluid distribution device 6 for influencing the flow paths of the refrigerant within the component module 1. The fluid distribution device 6 is fastened to the compressor housing 2 along the body length of the compressor housing 2 next to the second heat exchanger 4. For fastening, threaded holes (concealed) are formed on the circumference of the compressor housing 2. In the exemplary embodiment shown, the fluid distribution device 6 comprises a valve block 6.1 (see FIG. 2) with four valves 6.2.1 to 6.2.4 which are oriented in the valve block 6.1 parallel to the vertical axis V. The orientation of the valves 6.2.1 to 6.2.4 is thus transversely to the body length of the compressor housing 2 and parallel to the vertical direction V. The installation height of the fluid distribution device 6 ends with the body length of the second heat exchanger 4 in the vertical direction V. The valves 6.2.1 and 6.2.2 serve as expansion valves. On the refrigerant side, the valve block 6.1 has a direct connection to the compressor or the compressor housing 2, so that no additional external refrigerant fluid lines are required.

A collecting container 5 for refrigerant likewise forms a component of the component module 1. The collecting container 5 is fluidly connected to the second heat exchanger 4 and is designed to store refrigerant in liquid form. Its body length, which has a circular cylindrical shape, is greater than its body diameter, wherein the collecting container 5 is arranged next to the second heat exchanger 4 and is orientated with its body length parallel to the vertical direction V.

Since the body length of the collecting container 5 and the body length of the second heat exchanger 4 are orientated parallel, the collecting container 5 is thus orientated transversely to the first main direction T1 and consequently transversely to the body length of the first heat exchanger 3. In the exemplary embodiment shown, the collecting container 5 is thus arranged along the first main direction T1 transversely thereto next to the second heat exchanger 4, so that the second heat exchanger 4 is located along the first main direction T1 in an arrangement between the collecting container 5 and the first heat exchanger 3. The collecting container 5 is dimensioned such that it does not project beyond the second heat exchanger 4 in the vertical direction V.

In order to reduce noise, a muffler 7 is provided as a further component of the component module 1. The muffler 7 is designed as a part of a refrigerant fluid line 8.3 which is fluidly connected to the valve block 6.1 and has a body length greater than a body width. Within the component module 1, the muffler 7 is orientated with its body length essentially parallel to the longitudinal direction L next to the collecting container 5. In this orientation, the muffler 7 is arranged offset transversely to the collecting container 5 with respect to the collecting container 5 in the direction of the main directions T1 and T2. The muffler 7 is dimensioned with its body length such that it does not project beyond the second heat exchanger 4 or the compressor housing 2 in the longitudinal direction L. Due to its relatively small dimensions, the muffler 7 can also be arranged in a space-saving manner at other positions of the component module 1. For fluid connection, the muffler 7 has a refrigerant fluid interface 7.1, the opening of which is orientated parallel to the longitudinal direction L.

A further refrigerant fluid line 8.4, which is fluidly connected to the valve block 6.1, has a refrigerant fluid interface 13 which is offset in relation to the refrigerant fluid interface 7.1 of the muffler 7 in a direction parallel to the vertical direction V, wherein the opening of the refrigerant fluid line 8.4 is orientated parallel to the longitudinal direction L.

The spatial extent of the component module 1 is limited in the two main directions T1 and T2 on one side by an end face of the compressor housing 2 and on the opposite side by the muffler 7. In the longitudinal direction L, the spatial extent of the component module 1 is limited by a body length of the compressor housing 2 and on the opposite side by the first heat exchanger 3. The spatial extent of the component module 1 in the vertical direction V is limited by the second heat exchanger 4.

The reference numbers 9.1 to 9.4 identify electrical interfaces of the component module 1.

The exemplary embodiment shown in FIG. 1 is provided in particular for battery-electric vehicles.

Figure 2:
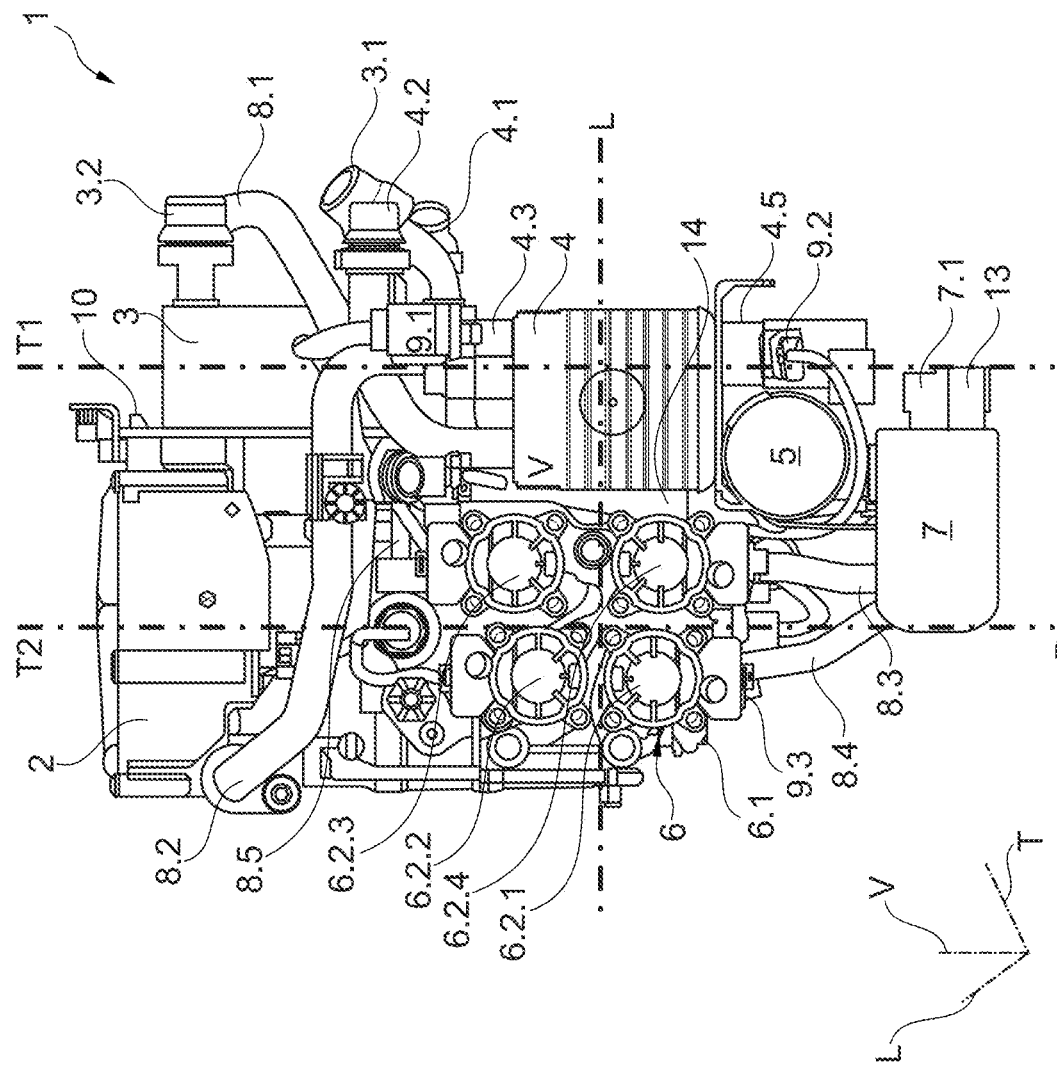
FIG. 2: shows a top view of the exemplary embodiment of the component module shown in FIG. 1 for a heat pump system of a vehicle.

FIG. 2 shows a top view of the exemplary embodiment of the component module 1 shown in FIG. 1 for a heat pump system of a vehicle in the vertical direction V. The top view illustrates the positions of the arrangement of the individual components of the component module 1. The arrangement of the second heat exchanger 4 with respect to the compressor housing 2 and the fluid distribution device 6 forms an intermediate space or air gap. Here, a further refrigerant line 8.5 can be seen, which connects the second heat exchanger 4 to the valve block 6.1.

LIST OF REFERENCE NUMERALS 1 component module
2 compressor housing
3 first heat exchanger
3.1, 3.2 coolant fluid interface
3.3 refrigerant fluid interface
4 second heat exchanger
4.1, 4.2 coolant fluid interface
4.3, 4.4, 4.5, 4.6 refrigerant fluid interface
5 collecting container
6 fluid distribution device
6.1 valve block
6.2.1, 6.2.2, 6.2.3, 6.2.4 valve
7 muffler
7.1 refrigerant fluid interface
8.1, 8.2, 8.3, 8.4, 8.5 refrigerant fluid line
9.1, 9.2, 9.3, 9.4 electrical interface
10 screw
11 inner side
12 outer side
13 refrigerant fluid interface
14 component module holder
T1 first main direction
T2 second main direction
L longitudinal direction
V vertical direction
R compressor rotation axis

The invention claimed is:

1. A component module of a heat pump system for a vehicle, the component module comprising:
a compressor with a compressor housing, which extends with a body length along a compressor rotation axis;
a first heat exchanger and a second heat exchanger, which have a body length greater than a body width;
a collecting container for a refrigerant; and
a fluid distribution device, which is designed for influencing a refrigerant flow path, refrigerant fluid interfaces, coolant fluid interfaces, and refrigerant fluid lines which fluidly connect the compressor, the first heat exchanger, the second heat exchanger, the collecting container, and the fluid distribution device to one another, wherein the first heat exchanger is orientated with the body length along a first main direction, the second heat exchanger is orientated with the body length orthogonally to the first main direction along a vertical direction, and the compressor housing is orientated with the body length along a second main direction which is parallel to the first main direction offset in a longitudinal direction.

2. The component module according to claim 1, wherein at least the first heat exchanger and/or the second heat exchanger is/are fastened to the compressor housing.

3. The component module according to claim 1, wherein the first heat exchanger is an evaporator/chiller for the refrigerant, and wherein the second heat exchanger is a condenser for the refrigerant.

4. The component module according to claim 1, wherein the first heat exchanger is an evaporator/chiller for the refrigerant, and wherein the second heat exchanger is a condenser with an internal heat exchanger for the refrigerant.

5. The component module according to claim 1, wherein the fluid distribution device has a valve block with at least two valves, wherein the valves in the valve block are orientated parallel to the vertical direction.

6. The component module according to claim 5, wherein the first heat exchanger and the valve block of the fluid distribution device are contacted with one another on mutually facing sides in such a way that no external ones of the refrigerant fluid lines are required between the first heat exchanger and the valve block of the fluid distribution device.

7. The component module according to claim 1, wherein an air gap is formed between the compressor housing and the second heat exchanger.

8. The component module according to claim 1, wherein the fluid distribution device is fastened to the compressor housing along the body length of the compressor housing next to the second heat exchanger such that it does not project beyond the body length of the second heat exchanger in the vertical direction.

9. The component module according to claim 1, wherein the collecting container for the refrigerant has a body length greater than a body width, and wherein the collecting container is arranged next to the second heat exchanger and is orientated with the body length parallel to the vertical direction.

10. The component module according to claim 9, wherein the collecting container does not project beyond the second heat exchanger in the vertical direction.

11. The component module according to claim 1, further comprising a muffler with a body length greater than a body width, wherein the muffler in addition to the collecting container with a body length is substantially oriented parallel to the longitudinal direction.

12. The component module according to claim 1, wherein the coolant fluid interfaces are located on one side of the component module.

13. The component module according to claim 1, wherein the second heat exchanger has an inner side and an outer side, wherein on the inner side at least one of the refrigerant fluid interfaces is formed oriented parallel to the second main direction, and wherein one of the refrigerant fluid lines connecting the compressor housing and the second heat exchanger is connected to the at the at least one of the refrigerant fluid interfaces.

14. The component module according to claim 13, wherein the one of the refrigerant fluid lines connecting the compressor housing and the second heat exchanger does not project beyond the second heat exchanger in the vertical direction.

* * * * *